US009002585B2

(12) United States Patent
Porter et al.

(10) Patent No.: US 9,002,585 B2
(45) Date of Patent: Apr. 7, 2015

(54) CONTROL SYSTEM FOR GROUNDS MAINTENANCE VEHICLE, AND GROUNDS MAINTENANCE VEHICLE INCLUDING SAME

(71) Applicant: Exmark Manufacturing Company, Incorporated, Beatrice, NE (US)

(72) Inventors: Trevor M. Porter, Lincoln, NE (US); Christian S. C. Bryant, Lincoln, NE (US); Garry W. Busboom, Beatrice, NE (US); David M. Converse, Lincoln, NE (US); John A. Swanson, Odell, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 36 days.

(21) Appl. No.: 14/013,169

(22) Filed: Aug. 29, 2013

(65) Prior Publication Data

US 2015/0066309 A1     Mar. 5, 2015

(51) Int. Cl.
| *F16H 59/00* | (2006.01) |
| *B60K 25/00* | (2006.01) |
| *B60W 10/06* | (2006.01) |
| *B60W 10/30* | (2006.01) |
| *F16H 61/68* | (2006.01) |

(52) U.S. Cl.
CPC ............. *B60K 25/00* (2013.01); *B60W 10/06* (2013.01); *B60W 10/30* (2013.01)

(58) Field of Classification Search
CPC .................................. F16H 61/68; G06F 19/00
USPC .............. 701/48, 67, 68; 475/210, 76; 477/47
See application file for complete search history.

(56) References Cited

U.S. PATENT DOCUMENTS

| 5,094,332 | A | 3/1992 | Wall |
| 5,562,173 | A | 10/1996 | Olson |
| 5,644,491 | A | 7/1997 | Fiske et al. |
| 5,679,085 | A * | 10/1997 | Fredriksen et al. ............. 475/76 |
| 6,517,465 | B2 | 2/2003 | Hrazdera |
| 6,609,357 | B1 | 8/2003 | Davis et al. |
| 6,668,530 | B2 | 12/2003 | Kern et al. |
| 6,892,517 | B2 | 5/2005 | Adams et al. |
| 7,588,514 | B2 * | 9/2009 | McKenzie et al. ............. 477/47 |
| 7,666,117 | B2 | 2/2010 | Kawakami et al. |
| 7,669,393 | B2 | 3/2010 | Park et al. |
| 7,669,580 | B2 | 3/2010 | Silbernagel et al. |
| 7,744,503 | B2 | 6/2010 | Kobayashi et al. |

(Continued)

OTHER PUBLICATIONS

"SenDEC Soft Start Controller for Electric Clutches," SenDec, Fairport, NY, Updated Jan. 28, 2011; 2 pgs.

*Primary Examiner* — Tan Q Nguyen
(74) *Attorney, Agent, or Firm* — Mueting, Raasch & Gebhardt, P.A.

(57) ABSTRACT

A control system for electronically controlling engine speed and PTO clutch mechanism engagement of a grounds maintenance vehicle such as a lawn mower. In one embodiment, an electronic controller (electronic control unit or ECU) may receive operator inputs from a speed setting switch and an on/off PTO clutch engagement switch. The ECU may take these inputs and make intelligent decisions as to when to engage/disengage the clutch mechanism and may change engine speed automatically prior to, during, and/or after clutch mechanism engagement/disengagement. In one or more of these speed setting switch positions, the switch may set a speed of the engine to a first speed when the clutch mechanism is disengaged, and a second speed (different than the first speed) when the clutch mechanism is engaged.

26 Claims, 7 Drawing Sheets

(56) References Cited

U.S. PATENT DOCUMENTS

| | | |
|---|---|---|
| 7,746,619 B2 | 6/2010 | Harnett et al. |
| 8,056,695 B2 | 11/2011 | Silbernagel |
| 8,175,790 B2 | 5/2012 | Stemler et al. |
| 8,320,096 B2 | 11/2012 | Harnett |
| 2007/0294017 A1 * | 12/2007 | Joshi et al. .................... 701/67 |
| 2010/0033890 A1 | 2/2010 | Harnett |
| 2010/0192907 A1 | 8/2010 | Stemler et al. |

* cited by examiner

CONTROL SYSTEM FOR GROUNDS MAINTENANCE VEHICLE, AND GROUNDS MAINTENANCE VEHICLE INCLUDING SAME

Embodiments of the present invention relate generally to grounds maintenance vehicles such as lawn mowers and, more particularly, to a control system for use with the same.

BACKGROUND

Grounds maintenance vehicles such as lawn mowers, aerators, and spreader/sprayers are used by consumers and professional alike. These vehicles are typically configured as walk-behind or ride-on vehicles having, in the case of a mower, a grass cutting deck (or other implement) attached thereto. Within the deck, cutting blades powered by an engine attached to the vehicle rotate at a speed sufficient to cut vegetation over which the deck passes during operation. The deck may be powered by the engine via an implement drive system. A power take-off (PTO) clutch is provided to allow the implement drive system to selectively engage with, or disengage from, the engine. That is, when the clutch is engaged, the engine may effectively power the implement drive system.

As one of skill can appreciate, engagement of the clutch may significantly increase the load, at least temporarily, on the engine. To avoid excessive clutch wear, the operator may reduce engine speed before clutch engagement and then increase engine speed after engagement to the desired operating speed. While effective, operator variability/effectiveness in making engine speed adjustments for clutch engagement/disengagement can be problematic. For instance, initially setting the engine speed too low may result in excessive droop or even engine stall, while setting the engine speed too high may result in premature wear or even failure of the clutch and related components.

Moreover, mower operators are known to momentarily disengage and engage the clutch without altering engine speed to, for example, traverse obstacles, pathways, and the like. Again, such action may result in premature wear and/or failure of the clutch and/or other drive system components as compared to the desired method of first lowering the engine speed prior to clutch engagement/disengagement. Still further, even when operators attempt to follow recommended clutch engagement/disengagement procedures, manually adjusting engine speed before, during, and/or after clutch engagement/disengagement can be inefficient and cumbersome. Accordingly, such recommendations are sometimes disregarded.

Yet another problem with conventional grounds maintenance vehicles such as lawn mowers is that many operators maintain an excessively high engine speed setting to ensure that a minimum effective cutting blade speed is maintained regardless of engine droop resulting from blade/engine loading. While practical, such an approach may result in providing more engine speed and more power than may be needed, and thus consumption of more fuel than necessary to accomplish the specific cutting task. In addition to increased fuel consumption, operating at higher engine speeds typically results in correspondingly higher overall noise from the engine and implement. For instance, other factors being equal, a dry lawn generally requires less power to cut than a wet lawn. As a result, a lower engine speed setting may be used without detrimentally affecting the quality of cut while also reducing fuel consumption and noise levels.

Still further, once engine load is reduced (e.g., once the clutch is disengaged), high engine speed is typically no longer required. Yet, many operators maintain a high engine speed setting after deck deactivation for convenience. If maximum transport speed is not required, maintaining a higher than necessary engine speed setting may again increase fuel consumption and engine noise without appreciable benefit. Moreover, operating in this fashion may result in the operator engaging the clutch at a higher than desired engine speed upon reaching the next mowing site.

SUMMARY

The present invention may overcome these and other issues with known implements by providing, in one embodiment, a grounds maintenance vehicle incorporating an engine with an electronic governor. An electronic control unit (ECU) may be provided between operator controls and the governor (and, optionally, between the controls and the clutch mechanism) of the vehicle. The ECU may be programmed or otherwise configured to control engine speed and, optionally, clutch mechanism engagement/disengagement to reduce or eliminate the above-identified issues. Moreover, the ECU may simplify operator interaction with the vehicle controls while ensuring that desirable blade tip speed and engine speed are maintained in a variety of conditions.

In one embodiment, a grounds maintenance vehicle is provided that includes: a chassis adapted to be supported upon a ground surface by a plurality of ground-engaging wheels; and an engine supported by the chassis, the engine adapted to power at least one of the plurality of ground-engaging wheels to propel the vehicle over the ground surface. The engine may include an output shaft and an engine speed regulator. The vehicle further includes: an implement drive system adapted to transmit power to an implement attached to the chassis; and an electronically controlled clutch mechanism disposed between the implement drive system and the output shaft of the engine. The clutch mechanism is configurable in both a disengaged state, wherein the engine is decoupled from the implement drive system, and an engaged state, wherein the engine is coupled to the implement drive system. A user-selectable power take-off (PTO) switch having an off setting corresponding to the disengaged state of the clutch mechanism, and an on setting corresponding to the engaged state of the clutch mechanism is also provided, as is a user-selectable engine speed switch adapted to set a speed of the engine at one of at least a discrete first speed setting and a discrete second speed setting. An electronic control unit (ECU) is provided and adapted to receive instructions from both the PTO switch and the engine speed switch and output both a speed command to the engine speed regulator and a clutch command to the clutch mechanism. For at least one of the first and second speed settings, the ECU is adapted to ultimately deliver to the engine speed regulator: a constant first engine speed command when the PTO switch is in the off setting; and a constant second engine speed command, different than the first engine speed command, when the PTO switch is in the on setting.

In another embodiment, a grounds maintenance vehicle is provided that includes: a chassis adapted to be supported upon a ground surface by a plurality of ground-engaging wheels; and an engine supported by the chassis and adapted to power at least one of the plurality of ground-engaging wheels to propel the vehicle over the ground surface, the engine including an electronic governor adapted to control engine speed. An implement drive system is included and is adapted to selectively couple to the engine. The implement drive system is adapted to deliver power to an implement attached to the chassis. The vehicle further includes an electronically controlled clutch mechanism disposed between the implement drive system and the engine. The clutch mechanism is configurable in both a disengaged state, wherein the engine is decoupled from the implement drive system, and an engaged state, wherein the engine is coupled to the implement drive system. Further included is: a user-selectable power take-off (PTO) switch movable between an off position corresponding to the disengaged state of the clutch mechanism, and an on position corresponding to the engaged state of the clutch mechanism; and an engine speed switch movable between any one of three discrete positions including: a first switch position corresponding to a maximum speed setting of the engine; a second switch position corresponding to a medium speed setting of the engine; and a third switch position corresponding to a low speed setting of the engine. The vehicle also includes an electronic control unit (ECU) adapted to receive inputs from both the PTO switch and the engine speed switch. The ECU is adapted to output engine speed commands to the electronic governor corresponding to each respective position of the engine speed switch. For at least one of the first, second, and third switch positions, the engine speed may be commanded to: a first engine speed when the PTO switch is in the off position; and a second engine speed, greater than the first engine speed, when the PTO switch is in the on position.

In still another embodiment, a method of controlling a grounds maintenance vehicle is provided. The method may include: providing an engine speed switch positionable in at least a discrete first and second position corresponding, respectively, to first and second speed settings of an engine of the vehicle; and selecting the first position with the engine speed switch. The method may also include: transmitting an input signal, corresponding to the first position of the engine speed switch, to an electronic control unit (ECU); transmitting, from the ECU to an engine speed regulator of the engine, a first engine speed command corresponding to the first speed setting, ultimately resulting in the engine attaining a first engine speed; receiving, with the ECU, a signal indicative of movement of a PTO switch from an off position to an on position; and transmitting, from the ECU to the engine speed regulator, a clutch engage engine speed command corresponding to a predetermined clutch engage engine speed. The method may further include: transmitting from the ECU to the engine speed regulator, a second engine speed command corresponding to a second engine speed that is higher than the clutch engage engine speed; and transmitting a clutch engage command from the ECU to a clutch mechanism while the engine speed is increasing from the clutch engage engine speed to the second engine speed.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 6A-6C illustrate exemplary graphs of engine speed versus time for three different operating scenarios, wherein: FIG. 6A reflects clutch engagement/disengagement at a first (e.g., maximum) engine speed; FIG. 6B reflects clutch engagement/disengagement at a second (e.g., medium) engine speed; and FIG. 6C represents clutch engagement/disengagement at a third (e.g., low) engine speed.

Figure 1:
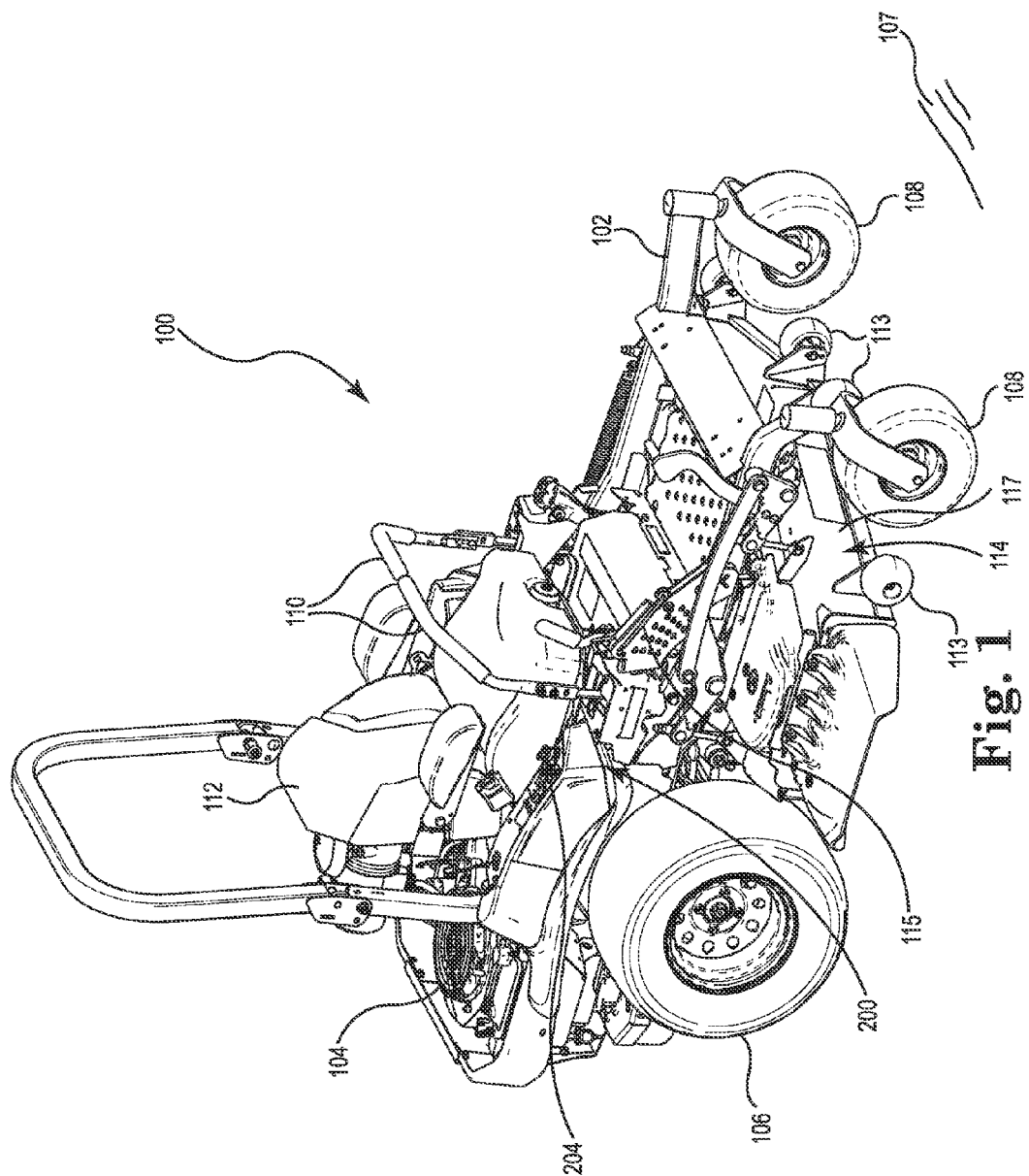
FIG. 1 illustrates a grounds maintenance vehicle, e.g., riding lawn mower, incorporating a control system having an electronic control unit (ECU) in accordance with one embodiment of the invention.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments of the invention. The lack of illustration/description of such structure/components in a particular figure is, however, not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the invention, as described herein, may be directed to control systems (e.g., incorporating an electronic control unit (ECU)) for controlling a speed setting of a prime mover (e.g., internal combustion engine), and optionally, engagement/disengagement of a PTO clutch mechanism, of a grounds maintenance vehicle such as a commercial riding lawn mower, and to other such grounds maintenance vehicles. For example, the mower may provide controls to receive operator inputs regarding desired engine speed (low engine speed, medium (e.g., efficient) engine speed, and maximum engine speed). The inputs may be provided to the ECU, which then, based on one or more monitored parameters, outputs a command to an engine speed regulator, e.g., to an electronic governor or an electronic throttle actuator, adapted to control a speed of the engine. In some embodiments, when the ECU receives an operator command to engage the PTO clutch mechanism, the ECU may manipulate the engine speed prior to and/or during clutch mechanism engagement (or disengagement) to ensure that the clutch mechanism is engaged (or disengaged) with minimal wear/stress while reducing engine speed droop.

In one embodiment, engine speed may be selected by an engine speed switch having two or more, e.g., three, discrete settings or positions. In one or more of these switch positions, the switch may command a speed of the engine to a first engine speed when the clutch mechanism is disengaged, and a second engine speed (different (e.g., greater) than the first engine speed) when the clutch mechanism is engaged. As a result, the control system may provide multiple but distinct engine speed settings that not only maintain mower blade speed and engine RPM in a variety of operating (e.g., mowing) situations, but also provide yet additional engine speed settings in transport (e.g., non-mowing) situations. Such a system may provide various benefits including reduced fuel consumption and reduced overall vehicle (e.g., engine and deck) noise. Moreover, by adjusting engine speed during clutch mechanism engagement/disengagement, systems in accordance with embodiments of the present invention may reduce wear and/or stress on the clutch mechanism and other drive system components.

Figure 2:
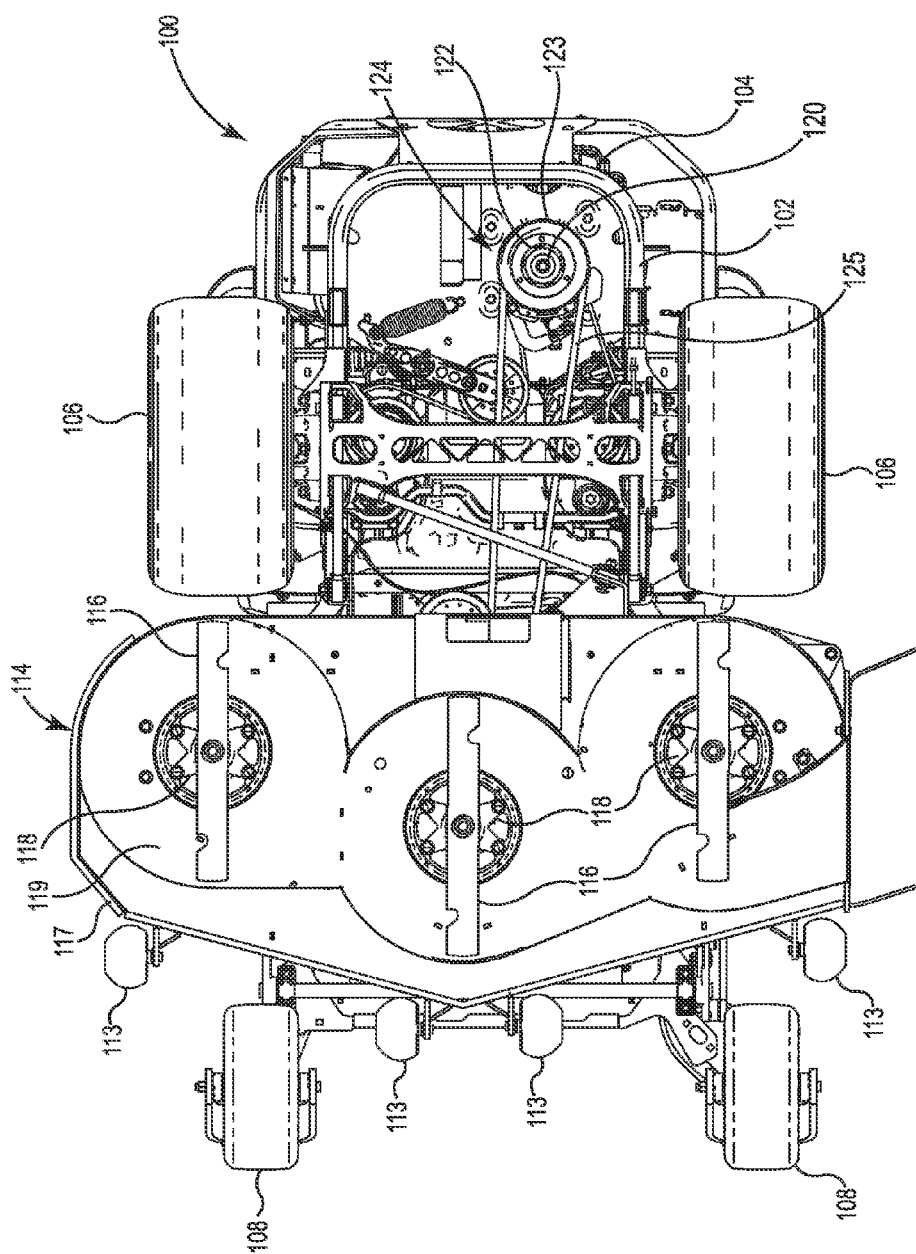
FIG. 2 is a bottom view of the mower of FIG. 1.

FIGS. 1 and 2 illustrate a grounds maintenance vehicle 100 in accordance with one exemplary embodiment of the present invention. While shown in this view as a self-propelled, turf maintenance vehicle, e.g., a zero-radius-turning (ZRT) riding lawn mower 100 (also referred to herein simply as a "mower"), such a configuration is not limiting. That is, while embodiments of the invention are described herein with respect to a riding mower, those of skill in the art will realize that the invention is equally applicable to other types of mowers (e.g., towed, walk-behind, etc.), as well as to other types of grounds maintenance vehicles/equipment (e.g., aerators, spreader/sprayers, dethatchers, snow throwers, debris management systems (e.g., blowers, vacuums, sweeper, etc.), roto-tillers, and the like).

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective observed in the particular figure, or as observed when the vehicle is in its typical operating orientation (see, e.g., FIG. 1). These terms are used only to simplify the description, however, and not to limit the scope of the invention in any way.

An exemplary mower configuration, although not necessarily central to an understanding of embodiments of the invention, is now briefly described. FIGS. 1 and 2 clearly illustrate the mower 100 having a chassis or frame 102 supporting a prime mover, e.g., internal combustion engine 104. Left and right ground engaging drive wheels 106 may be rotatably coupled to left and right sides of a rear portion of the mower 100. The drive wheels 106 may be independently powered by the engine (e.g., via one or more hydraulic motors, transmissions, or the equivalent) so that the drive wheels 106 may selectively propel the mower 100 over a ground surface 107 during operation.

One or more controls, e.g., left and right drive control levers 110 may also be provided. The drive control levers 110 are generally pivotally coupled to the mower such that they may pivot forwardly and rearwardly under the control of an operator sitting in an operator's seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the invention. In the illustrated embodiment, a pair of front swiveling caster wheels 108 may support a front portion of the mower 100 in rolling engagement with the ground surface 107 during operation.

The mower 100 may further include a control panel 204. The control panel 204 may include various mower controls and may further display general status information regarding mower systems. An exemplary embodiment of the control panel 204 is further described below.

A lawn mower cutting deck 114 may be mounted to the lower side of the frame 102, e.g., generally between the drive wheels 106 and the caster wheels 108. The cutting deck 114 may include a deck housing 117 that partially defines an enclosure forming a cutting chamber 119 (see FIG. 2). The cutting chamber 119 may partially surround one or more rotatable cutting blades 116 each attached to a blade spindle assembly 118 as is known in the art.

During operation, power is selectively delivered to the cutting deck 114 (e.g., to the spindle assemblies) and the drive wheels 106, whereby the cutting blades 116 rotate at a speed sufficient to sever grass and other vegetation as the deck passes over the ground surface 107. Typically, the cutting deck 114 further has an operator-selectable height-of-cut control system 115 (see FIG. 1) to allow deck height adjustment relative to the ground surface 107. The cutting deck 114 may optionally include anti-scalp rollers 113 to assist in reducing blade/ground contact.

With this general overview, an embodiment of an exemplary control system 200 will now be described. As indicated above, the control system 200 of the vehicle 100 may include the control panel 204, an exemplary embodiment of which is illustrated in more detail in FIG. 3. The control panel 204 may be positioned on the vehicle at a location accessible to the operator while sitting in the operator's seat 112 (see FIG. 1). In the illustrated embodiment, the control panel includes operator-selectable controls (e.g., switches) configured to provide inputs to the control system 200 as shown schematically in FIG. 4. For example, the panel 204 may include a key/ignition switch 202 for starting the engine 104. Moreover, the panel may include one or more informational displays 206 to relay various vehicle parameters including, but not limited to, engine run time (hour meter), fuel level, battery status, clutch mechanism status, park brake status, etc. Warning indicators 208 (e.g., lights) may also be provided to indicate parameters such as engine fault codes, elevated engine temperature, and low oil pressure.

Figure 3:
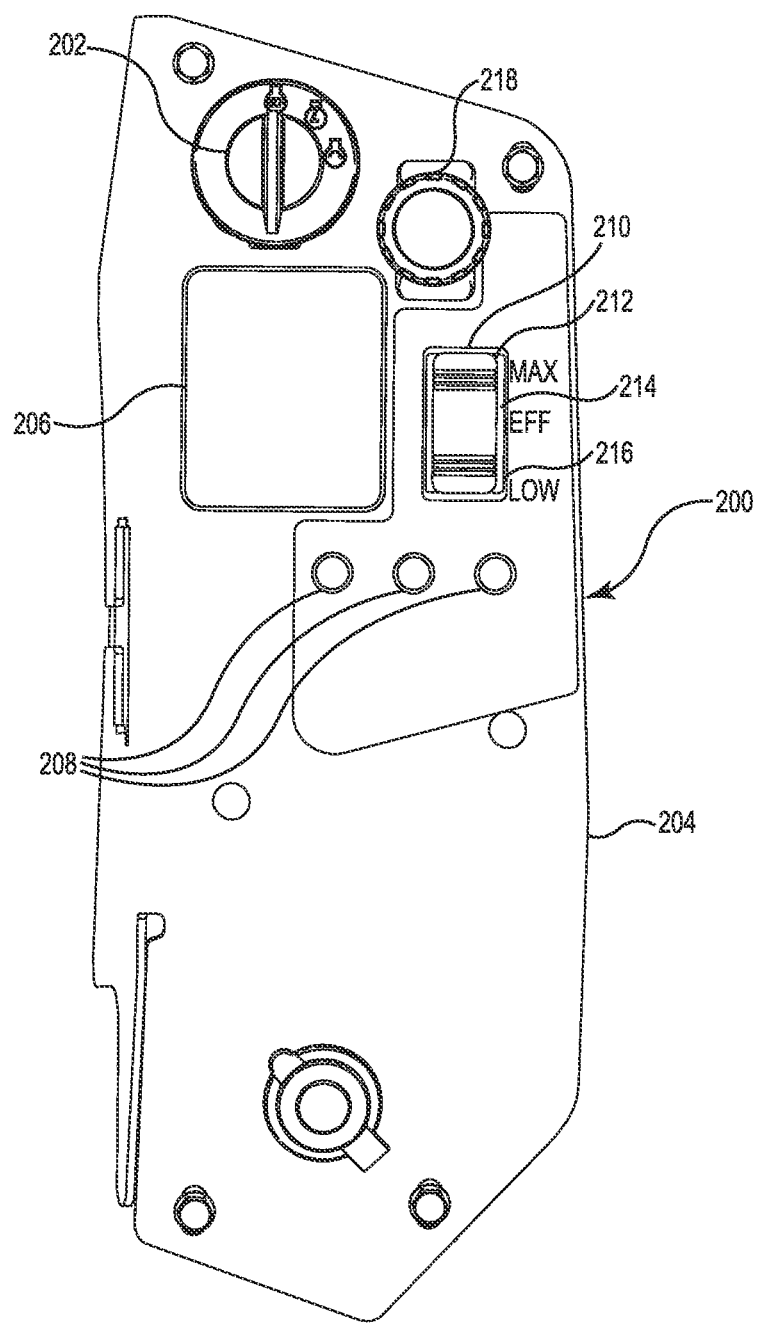
FIG. 3 is a top plan view of a control panel for interacting with the ECU in accordance with one embodiment of the invention.

In the illustrated embodiment, the panel 204 may further include, in lieu of a conventional throttle lever, a user-selectable, multi-setting (e.g., multi-position) engine speed switch 210. The engine speed switch is illustrated in FIG. 3 as a three-position rocker-type switch having a discrete first switch position 212 corresponding to a maximum speed setting of the engine, a discrete second switch position 214 corresponding to an intermediate or "efficient" speed setting of the engine (less than the maximum speed setting), and a discrete third position 216 corresponding to a low speed setting of the engine (less than the intermediate speed setting). Operation of the engine speed switch 210 is further described below.

While described and illustrated herein as a three-position rocker-switch, such a configuration is not limiting. In fact, most any switch or combination of switches or switch-like devices capable of together providing the multiple (e.g., two or more) discrete speed settings described herein are possible without departing from the scope of the invention. For example, the switch 210 could be configured as: three separate momentary switches (one for initiating each speed setting); a rotary switch with multiple detent positions; a lever having distinct detent positions; a sliding knob with distinct detent positions; a depress-and-hold switch; a capacitive touch switch; and a bump-up switch providing multiple bumps. In fact, most any activation method now known or later developed (e.g., including non-contact methodologies such as voice-control) may be used without departing from the scope of the invention.

In the illustrated embodiment, the panel 204 may also include a user-selectable PTO or clutch engagement switch 218. The PTO switch 218 may, in the illustrated embodiment, be configured as a two-setting (e.g., two-position push-pull) switch, although most any type of input mechanism is contemplated. The switches 210 and 218 are described and illustrated herein as mechanical switches physically movable between different switch positions. However, as stated above, other non-movable switches (e.g., contact switches) are also contemplated. As a result, the term "position" (as used herein to described aspects of at least the switches 210 and 218), is understood to also include any distinct setting or output provided by a non-movable switch. Moreover, the term "movable" and its variations (as used herein to describe at least the switches 210 and 218), is understood to include any manipulation of the switch that results in altering the switch's setting or output, regardless of whether this manipulation is accompanied by any physical movement of the switch.

Figure 4:
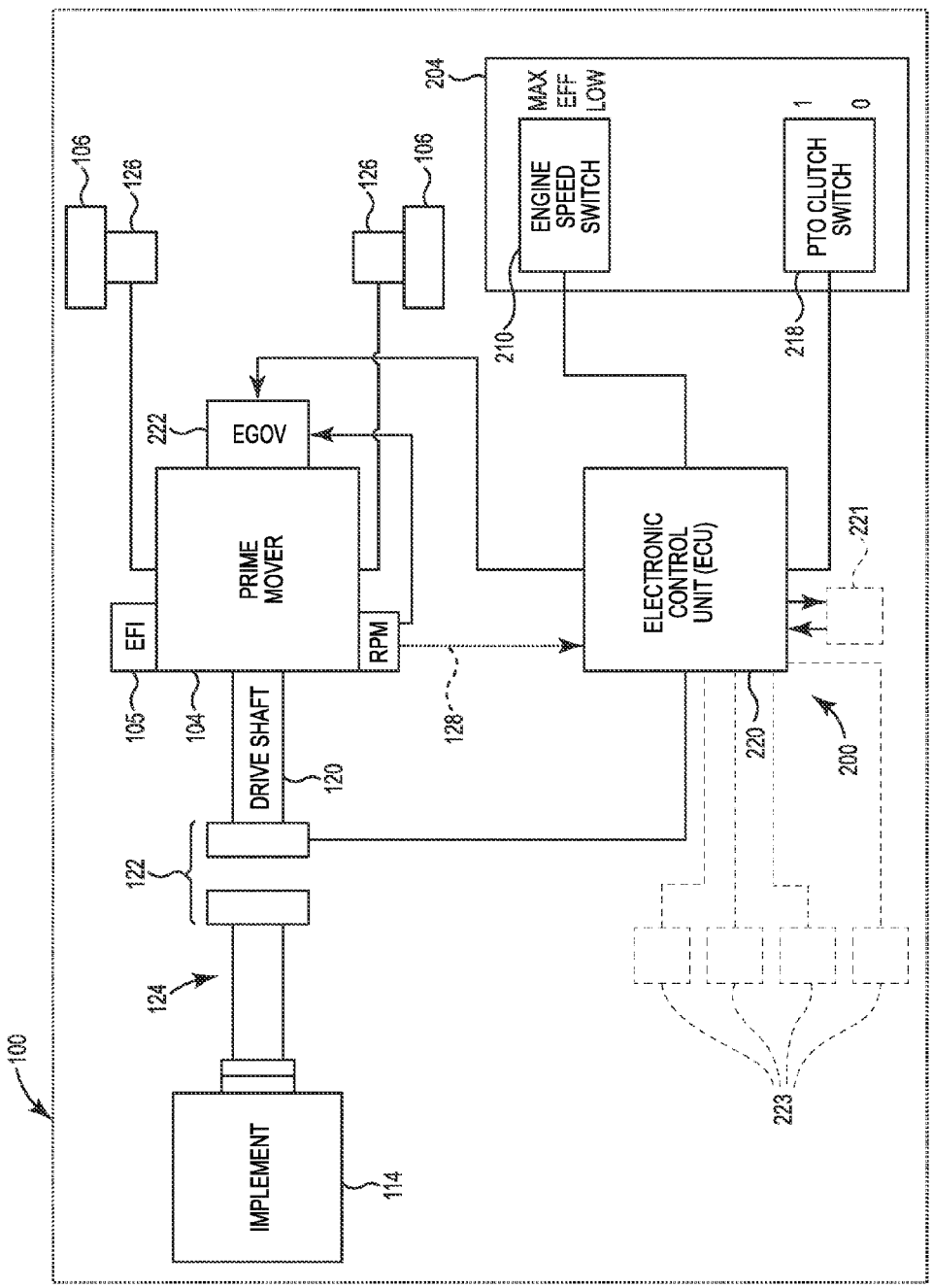
FIG. 4 is a schematic view of a control system incorporating the ECU in accordance with one embodiment of the invention.

FIG. 4 is an exemplary, partial schematic diagram of the mower 100. In the illustrated embodiment, the mower 100 may be configured as a zero-radius-turn mower driven by dual hydrostatic drive systems 126 that are each powered by the engine 104 (e.g., via one or more drive belt (see FIG. 2) or the like). Each drive system 126 may independently control the speed and rotational direction of its respective drive wheel 106 based upon input provided by the operator via the respective drive control levers 110 (see FIG. 1). Accordingly, the mower may be directed over the ground surface 107 in the desired direction and at the desired speed via the hydrostatic drive systems.

To selectively provide power to the cutting deck 114 (or other implement), the engine 104 may include an output or drive shaft 120 configured to couple and decouple to an implement drive system 124 under the control of a PTO clutch mechanism 122. In one embodiment, the implement drive system 124 could include a conventional PTO shaft drivingly connected to the implement (e.g., to the cutting deck 114) and selectively rotated by the engine 104 when the clutch mechanism (disposed between the implement drive system and the drive shaft 120 of the engine) is engaged. In another embodiment, the implement drive system 124 may include a sheave 123 and belt 125 as shown in FIG. 2. In the case of the latter, the clutch mechanism may selectively cause the sheave 123 to couple-to/decouple-from the engine drive shaft 120.

As used herein, the term "clutch mechanism" may include most any electrically controlled transmission or coupling system including, for example, a conventional electro-magnetic clutch, a continuously variable transmission device, or any other equivalent power transmission system. In the illustrated embodiment, the clutch mechanism is configured as an electro-magnetic PTO clutch 122 (e.g., a model CMS200 Magstop Clutch/brake available from Warner Electric LLC of South Beloit, Ill., USA). To energize the clutch 122 (e.g., to place the clutch into an engaged state whereby it mechanically couples the engine to the implement drive system), an electric signal (e.g., current) is provided to the clutch, producing a magnetic field that draws two clutch components (see, e.g., FIG. 4) tightly together, effectively permitting transmission of rotational power through the clutch. To de-energize the clutch 122 (e.g., to place the clutch into a disengaged state whereby the engine is de-coupled from the implement drive system), the electric signal is terminated. Once the signal is so terminated, the clutch components may separate, mechanically disconnecting the implement drive system 124 from the drive shaft 120. In the illustrated embodiment, the disengaged state of the clutch corresponds to an off position of the switch 218, while the engaged state corresponds to an on position of the switch 218.

In the illustrated embodiment (see, e.g., FIG. 4), the engine 104 includes an electronic governor (EGOV) 222 and, optionally, an electronic fuel-injection (EFI) system 105, wherein the EGOV is capable of changing or otherwise regulating engine speed. As used herein, the term "electronic governor" or "EGOV" may include most any system operable to electrically control and/or regulate at least engine speed. Moreover, a system incorporating EGOV in accordance with embodiments of the present invention may be used with or without an EFI system. For example, EGOV can be used with a diesel engine, a carbureted engine, or similar prime mover without departing from the scope of the invention.

As shown in FIG. 4, the control system 200 may include, among other components, the panel 204 and its associated controls (e.g., switches 210 and 218), as well as an electronic control unit (ECU) 220 (which may be an integrated, microprocessor-based module) configured to receive electrical input signals from, among others, the switches 210 and 218. The ECU 220 may then transmit, based upon pre-programmed logic, electrical command signals to the engine 104 (e.g., a speed command to the electronic governor 222) and to the clutch 122 (e.g., a clutch command) as described herein. As further described below, the ECU 220 may, when the speed switch 210 is in at least one of the positions 212, 214, and 216, be configured to ultimately deliver to the engine speed regulator (e.g., to the governor): a first engine speed command when the mower 100 is in a first configuration (e.g., when the PTO switch 218 is in the off position); and a second engine speed command different than the first engine speed command when the mower is in a second configuration (e.g., when the PTO switch is in the on position). While described herein as a microprocessor-based system, an alternative ECU could utilize other components such as relays and timers to achieve the desired results, either alone or in combination with a microprocessor-based system.

For example, in the illustrated embodiment, the control system 200 is configured to provide an engine speed correlating to not only any one of the "maximum," "efficient," and "low" speed settings (switch positions 212, 214, and 216, respectively) selected by the operator via the speed switch 210, but also to set the engine speed to a different speed (at least in some circumstances), based on the same speed setting of the switch 210, depending on whether the clutch 122 is engaged or disengaged.

For instance, in one embodiment, the ECU may set engine speed according to Table I.

TABLE I

| Position of Speed Switch 210 | Engine Speed with PTO Clutch Disengaged (PTO Switch 218 Off), RPM | Engine Speed with PTO Clutch Engaged (PTO Switch 218 On), RPM |
|---|---|---|
| First or "Maximum" Position 212 | $S_{MAX,PD}$ (e.g., 3650) | $S_{MAX,PE}$ (e.g., 3650) |
| Second or "Efficient" Position 214 | $S_{MED,PD}$ (e.g., 2500) | $S_{MED,PE}$ (e.g., 3400) |
| Third or "Low" Position 216 | $S_{LOW,PD}$ (e.g., 1500) | $S_{LOW,PE}$ (e.g., 3250) |

Of course, the exemplary engine speeds identified in Table I are selected based upon the output and other characteristics of a particular engine (e.g., a model ECV940 EFI with EGOV gasoline engine distributed by Kohler Engine Division, Kohler Co., of Kohler, Wis., USA) and/or machine. As a result, other engine speeds for some or all of the categories identified in Table I are certainly possible without departing from the scope of the invention. Moreover, while the first or maximum switch position 212 actually yields the same engine speed regardless of the position of the clutch switch, other embodiments may utilize a speed differential between these two conditions without departing from the scope of the invention.

As stated elsewhere herein, the three-position rocker switch 210 is exemplary only. One alternative contemplated is an engine speed control system utilizing a two-position momentary switch and ECU providing multiple, e.g., seven, distinct settings corresponding to, for example, 1500, 1800, 2100, 2400, 2700, 3000, and 3650 RPM. Tapping the switch in a first direction could increase the engine speed sequentially through these settings, while tapping the switch in the second opposite direction could similarly reduce the engine speed sequentially through these settings. Holding the switch down in the first direction, e.g., for 0.5 seconds, may set the engine speed to the maximum setting (e.g., 3650 RPM), while holding the switch down in the second direction may set the engine speed to its lowest or idle setting (e.g., 1500 RPM).

In the embodiment illustrated in FIG. 4, the ECU 220 operates as an open loop controller. That is, the ECU may not actively monitor engine speed (in revolutions/minute (RPM)), but rather may merely output a voltage signal (command) to the electronic governor 222, the voltage signal being calibrated to provide a specific engine speed. For example, in one embodiment, the output signal provided by the ECU 220 to the governor 222 may vary between 0 and 10 Volts DC (VDC). A voltage of one VDC or less may command the governor 222 to provide the third or "low" engine speed (when the clutch is disengaged) of about 1500 RPM, while a voltage of 10 VDC or greater to the governor will command the engine to its first or "maximum" speed of about 3650 RPM. The engine 104 may provide a generally linear response between these two engine speeds when the voltage input is one to 9 VDC. Accordingly, the ECU may be programmed to command the engine to most any speed by outputting a corresponding command signal of known voltage.

Based upon the speed command received by the governor 222 from the ECU 220, the desired engine speed is recognized. The governor 222 may then monitor actual engine speed (e.g., via feedback from an engine speed (tachometer) device as indicated in FIG. 4) and adjust the governor to maintain this desired speed.

In alternative embodiments of the invention the ECU 220 could also receive an engine speed signal input 128 (e.g., from the engine speed device as diagrammatically represented in FIG. 4, or from the EFI module) and adjust the speed command to the governor 222 based upon the engine speed feedback signal.

Control system configurations such as those described and illustrated herein allow the engine speed to be set based upon different mowing conditions (e.g., wet, dry, short). As a result, efficient mowing may be achieved without running at an engine speed higher than required for the particular turf conditions. As a result, benefits such as reduced: fuel usage; overall noise; and system wear may be realized. Moreover, when the clutch 122 is disengaged (e.g., when the mower is in a transport mode), the ECU may set a different engine speed for the same engine speed setting (e.g., position) of switch 210 without requiring specific operator interaction. Accordingly, if the switch is in, for example, the second position, the engine speed may be automatically reduced when the clutch is disengaged without depreciably affecting ground speed of the vehicle. As a result, benefits including reduced: fuel consumption; engine noise; and system wear may be realized during mower transport as well.

The ECU 220 may provide additional advantages. For example, in one embodiment, the ECU may synchronize engine speed with clutch engagement by reducing engine speed, if necessary, before engagement and/or by ensuring clutch engagement occurs only when the engine is accelerating (only when engine speed is increasing). Since operator interaction/variability is removed from the clutch engagement process, the life of the engine, clutch, and related drive components may be extended as compared to systems wherein the clutch may potentially be engaged at undesirably high or low engine speeds. Such a system may further improve operator efficiency by allowing "on-the-fly" engagement/disengagement of the clutch (e.g., when the operator needs to disengage the clutch to traverse, for example, pavement or the like) without operator concern for engine speed setting and/or engine speed adjustment.

Figure 5A:
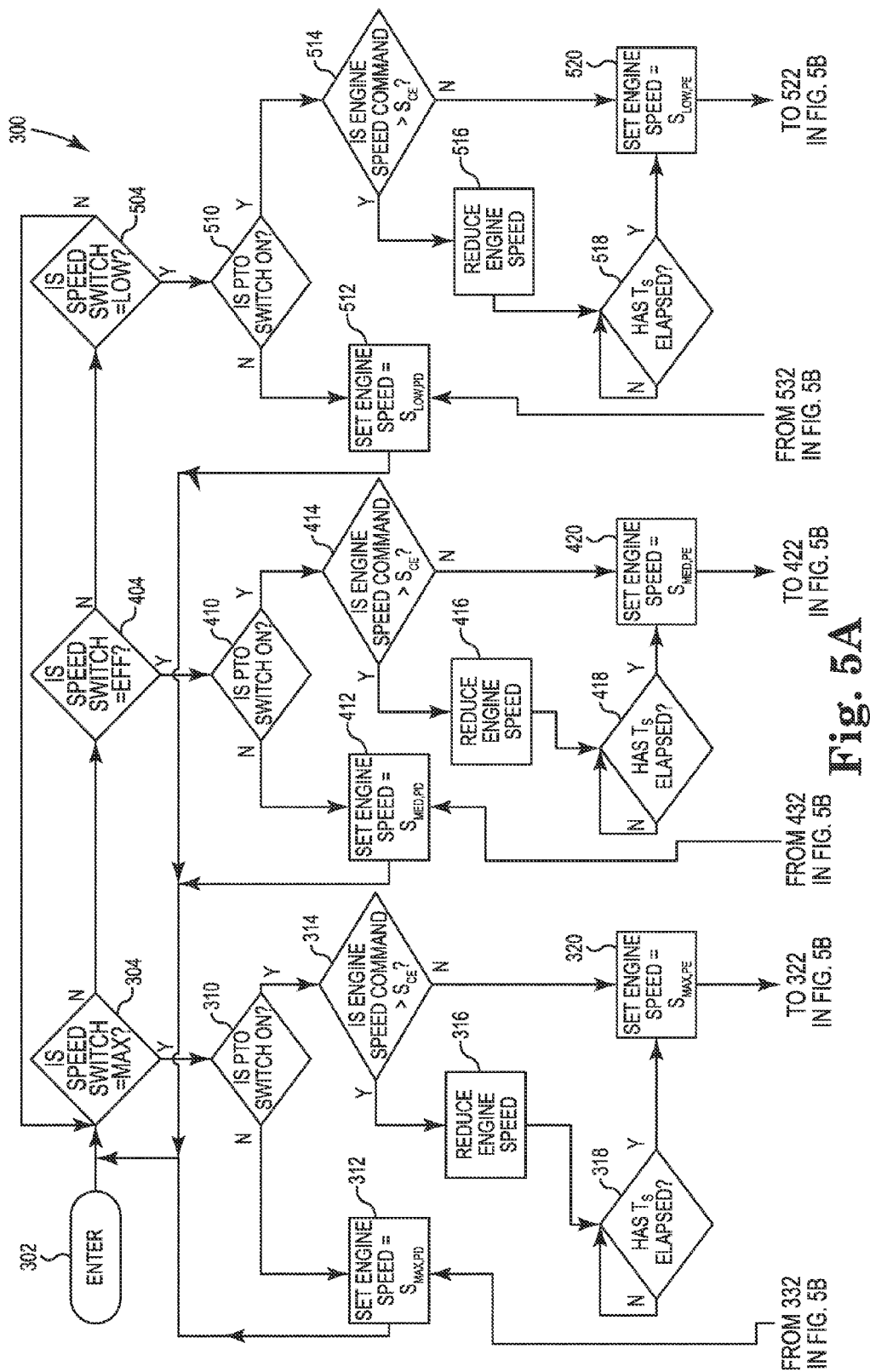
FIGS. 5A and 5B combined define a flow chart in accordance with one embodiment of the invention, the flow chart illustrating exemplary ECU method logic for controlling engine speed and clutch engagement of a grounds maintenance vehicle.
Figure 5B:
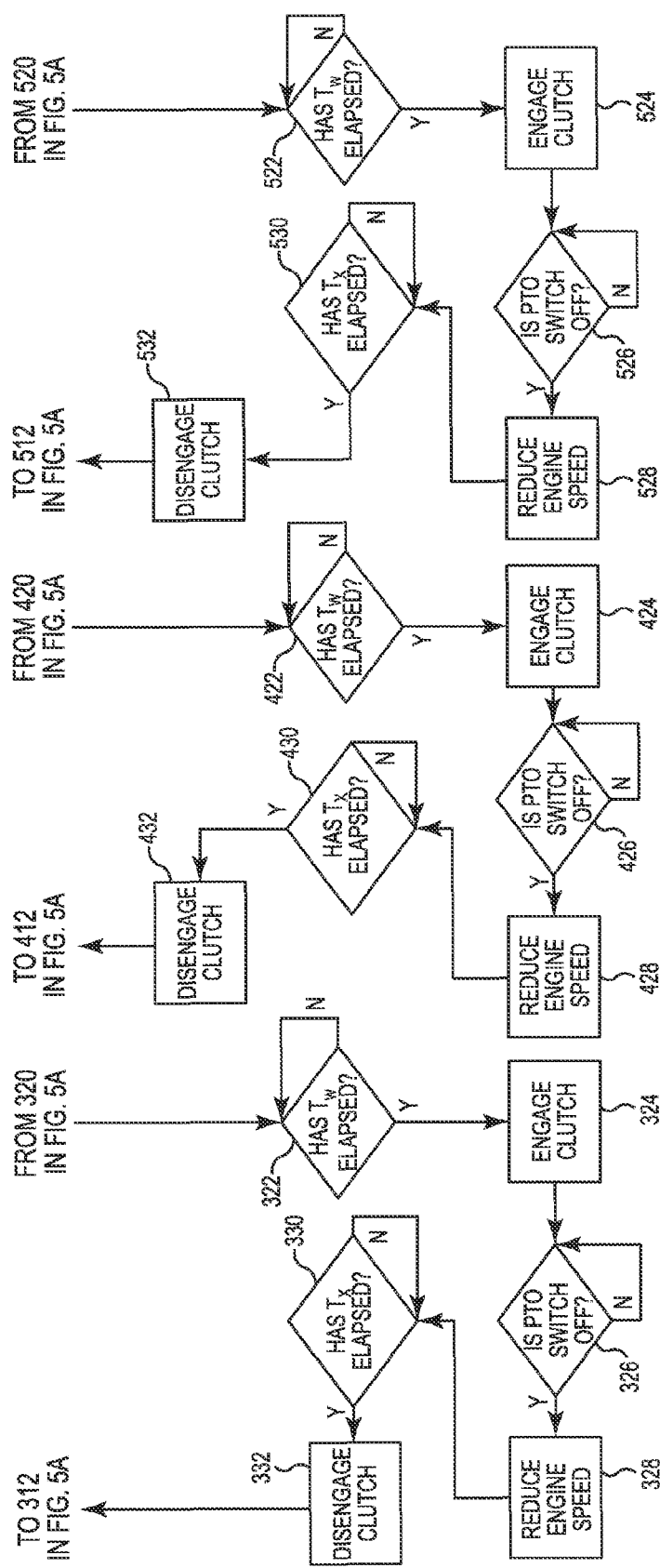

FIGS. 5A and 5B (which may collectively be referred to herein as FIG. 5) provide an exemplary flow chart illustrating logic 300 of the ECU 220 in accordance with one embodiment of the invention. The exemplary method illustrated in this flow chart assumes an open loop control process for the ECU (i.e., no RPM feedback from the engine 104 is provided to the ECU). Those of skill in the art will realize that the logic may be revised to accommodate RPM feedback (as optionally indicated with input 128 in FIG. 4) for a closed loop variation. In conjunction with FIGS. 5A and 5B, FIGS. 6A-6C provide exemplary engine speed versus time graphs for clutch engagement and disengagement at the different engine speed settings identified in FIGS. 5A and 5B.

The control procedure is entered at 302 (process assumes that the mower engine 104 is running and that the PTO switch 218 is initially set to the off position). The ECU 220 may first determine the position of the engine speed switch 210 (i.e., determine whether it is in the first or maximum position (212) at 304, the second or efficient position (214) at 404, or the third or low position (216) at 504).

Figure 6A:
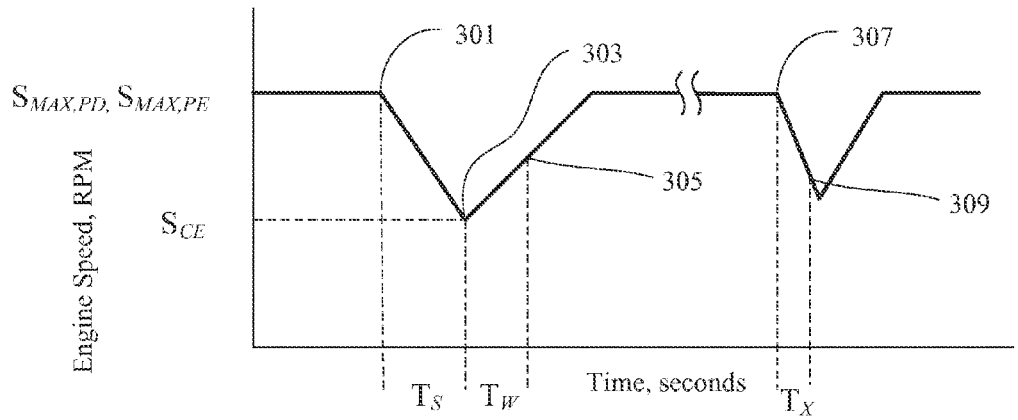

Assuming the engine speed switch 210 is in the first or maximum position 212, the ECU then determines whether the PTO switch is on at 310. If the PTO switch is off, the ECU 220 commands the engine speed at 312 to a first engine speed, $S_{MAX,PD}$ and then control loops back to 304 as shown. Alternatively, if the PTO switch 218 is determined to be in the on position at 310, the ECU 220 may first determine if the engine speed is commanded to a speed greater than a desired and predetermined clutch engagement speed, $S_{CE}$ (e.g., about 2500 RPM), at 314 (e.g., by estimating engine speed from the command voltage provided to the governor 222). As used herein, $S_{CE}$ is not the engine speed desired for clutch engagement, but is rather the desired speed from which to initiate engine acceleration during the clutch engagement process. If the answer at step 314 is yes, the ECU 220 may command the electronic governor 222 to reduce the engine speed at 316. In the illustrated open loop embodiment of FIGS. 5A and 5B, this is accomplished by having the ECU simply provide a step command to a lower engine speed (e.g., to idle or about 1500 RPM) at 316. In FIG. 6A, step 316 corresponds to point 301. The ECU may then determine when the engine speed reaches a predicted speed equal to or less than $S_{CE}$ by monitoring, at 318, an elapsed time $T_S$ since step 316 was initiated (based on known engine/system deceleration curves). Alternatively, in embodiments utilizing the optional speed input 128 received from the engine speed sensor (see FIG. 4), 316 may be replaced with a command to set the engine speed equal to or less than $S_{CE}$ and step 318 may be replaced with a decision to pass control (to 320) only when engine speed is equal to or less than $S_{CE}$ (based upon the engine speed signal received from input 128). In either embodiment, 318 may thus loop until the engine speed is estimated, measured, or otherwise determined to be equal to or less than $S_{CE}$ (as represented by point 303 in FIG. 6A), after which the ECU 220 commands the governor 222 to set the engine speed to a second engine speed $S_{MAX,PE}$ at 320.

In the illustrated embodiment, the ECU 220 may command the engine speed from $S_{CE}$ to $S_{MAX,PE}$ (which is higher than $S_{CE}$) via a step voltage input. Based on known engine/system acceleration curves, the ECU may wait for a predetermined period of time $T_W$ (e.g., 0.5 seconds) to elapse after commanding the engine speed to $S_{MAX,PE}$ as indicated at 322. Once the time $T_W$ has passed, the ECU may issue a clutch engage command to cause the clutch 122 to engage at 324 (corresponding to point 305 in FIG. 6A) by delivering an electrical signal to the clutch. In one embodiment, the clutch engage command may be issued at about 2750 RPM. The period of time $T_W$ may be programmed to ensure the engine is accelerating (from $S_{CE}$) before clutch engagement begins. The engine speed may continue to accelerate until reaching the second engine speed $S_{MAX,PE}$ as shown in FIG. 6A. Those of skill in the art will realize that this sequence may be modified accordingly in embodiments that utilize the optional speed input 128 (see FIG. 4).

By reducing the engine speed automatically (without additional operator input) to $S_{CE}$ before engaging the clutch, shock loading/stress to the clutch, engine, and the associated drive train may be reduced. Moreover, the logic described above, combined with the known/predetermined engine/system acceleration and deceleration curves (or the optional speed input 128), ensures that the engine speed is accelerating (e.g., from $S_{CE}$ to $S_{MAX,PE}$) along a known curve when the clutch begins engagement. As a result, engine droop may be substantially reduced. In one embodiment, the clutch will completely engage prior to or by the time the engine reaches $S_{MAX,PE}$.

The ECU 220 may continue to monitor the position of the PTO switch 218 at 326 while the clutch is engaged. Once the PTO switch 218 is moved to the off position (e.g., at the end of the mowing operation), a corresponding signal is transmitted to the ECU. The ECU may then issue a command to the governor 222 to reduce engine speed (as indicated by point 307 in FIG. 6A), e.g., to a speed that may be at or below a clutch disengagement speed $S_{DE}$ at 328. While $S_{DE}$ could be the same engine speed as $S_{CE}$, it is anticipated that it may be different to better accommodate the dynamic characteristics of the decelerating engine/cutting deck combination.

The engine speed may immediately begin to fall and, once estimated, measured, or otherwise determined to be at or below $S_{DE}$ at 330 ($S_{DE}$ is indicated in FIG. 6A by point 309), the clutch may be disengaged (de-energized) at 332. The estimation/determination of whether the engine speed is at or below $S_{DE}$ at 330 may be made based on expiration of a period of time $T_X$ (e.g., 0.5 seconds) that begins once the command is issued at 328 (e.g., once again, the actual value of $T_X$ may be selected based on known/predetermined engine/system acceleration/deceleration curves). That is, the delay provided by the period of time $T_X$ may be selected to allow the engine and the cutting blades 116 to slow together for this specific period of time. This simultaneous and coordinated slowing of the engine and blades is beneficial in that it can actually reduce the total amount of time required for the blades to come to a complete stop. That is, the clutch disengagement speed $S_{DE}$ may be selected to reduce a stop time of the implement (e.g., cutting blades of the deck) by relying, at least in part, on deceleration of the engine. In this manner, the stop time of the cutting deck may advantageously be reduced (as compared to immediate clutch disengagement upon movement of the switch 218) as a result of the effects of slowing of the engine itself. Moreover, wear to the clutch, engine, and associated drive train may be minimized as opposed to systems wherein clutch disengagement occurs at an undesirably higher speed.

Alternatively, in embodiments utilizing the input 128 (see FIG. 4) for closed loop control by the ECU, 328 (see FIG. 5B) could instead represent a command to set the engine speed equal to or less than $S_{DE}$ and step 330 could loop until actual measured engine speed is equal to or less than $S_{DE}$, after which control could be passed to 332. In still another embodiment, clutch engagement/disengagement could be controlled based on a combination of engine speed feedback and the expiration of a period of time (e.g., $T_X$). As one skilled in the art may appreciate, since the engine speed prior to clutch disengagement may vary depending on the position of the engine speed switch 210, $S_{DE}$ may represent a different speed for each of the engine speed switch settings 212, 214, 216.

With the clutch disengaged (e.g., in the de-energized state), the ECU may then issue a command to the governor to set engine speed at $S_{MAX,PD}$ at 312 and return control to 304. The ECU may then command this engine speed until the speed setting switch 210 is moved to another position or the PTO switch is again engaged.

Figure 6B:
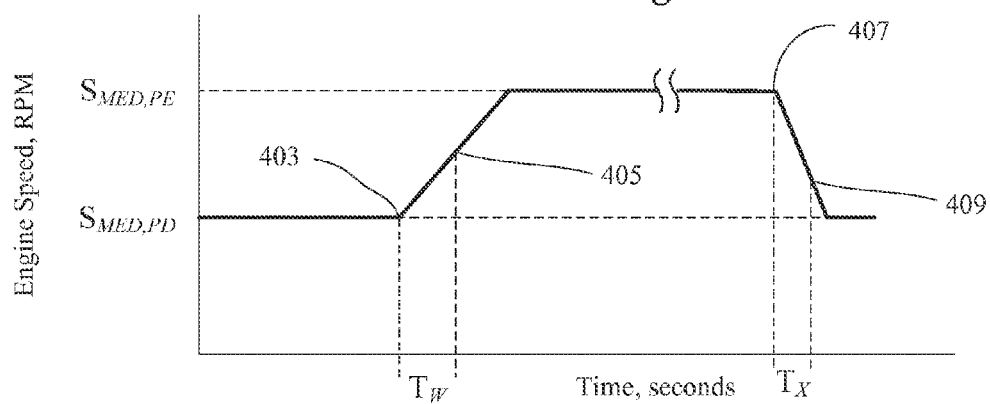
Figure 6C:
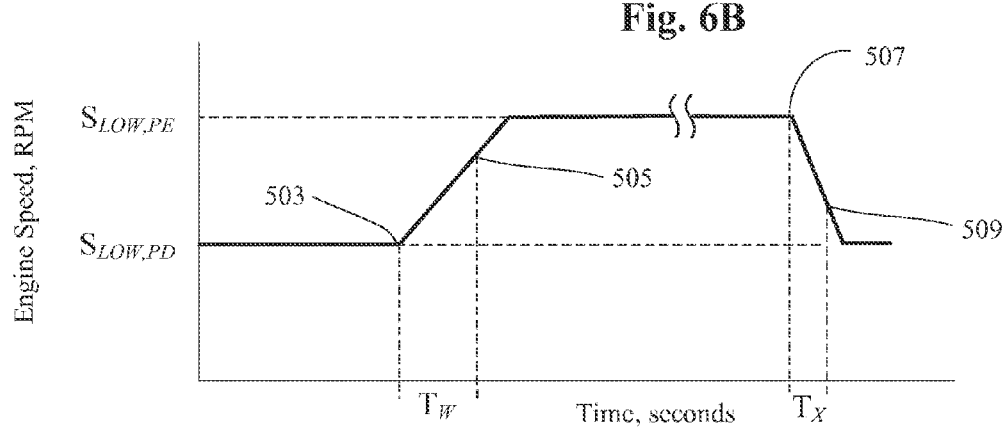

As is clear from FIGS. 5A and 5B, similar logic is followed when the engine speed setting (e.g., switch 210) is set to the second or efficient position (214) at 404 or the third or low position (216) at 504. For brevity, description of the ECU logic for these two settings is not explicitly provided herein as it may be clearly understood by replacing, in the description provided above, the reference numerals 3xx with corresponding reference numerals 4xx (for the switch position 214) or 5xx (for the switch position 216) and similarly replacing $S_{MAX,PD}$ and $S_{MAX,PE}$ with: $S_{MED,PD}$ and $S_{MED,PE}$, respectively (for the switch position 214); or with $S_{LOW,PD}$ and $S_{LOW,PE}$, respectively (for the switch position 216). It is noted, however, that for the exemplary identified engine speeds associated with both the second or medium (efficient) switch position 214 (see 404 in FIG. 5A) and the third or low speed switch position 216 (see 504 in FIG. 5A), the engine speed command may already be less than or equal to $S_{CE}$. As a result, the determination made at steps 414 and 514 in FIG. 5A will be "no" and control will therefore pass immediately to steps 420 and 520, respectively. That is, unlike for the maximum speed setting of the switch 210 described above, steps 416, 418 and 516, 518 are bypassed, at least for the exemplary medium (efficient) and low speed switch settings as described herein. For example, FIG. 6B is similar to FIG. 6A, but illustrates engine speed versus time when the engine speed switch 210 is in the second position 214 and the PTO switch 218 is moved from the disengaged to the engaged position at point 403. As shown in this figure, since the engine speed is less than or equal to $S_{CE}$, the engine speed may accordingly ramp directly from $S_{MED,PD}$ to $S_{MED,PE}$ (i.e., there is no deceleration ramp similar to that initiated at point 301 in FIG. 6A). The ECU may then command delivery of the electrical signal (e.g., current) to the clutch after expiration of a period of time $T_W$ as indicated at point 405 (e.g., which may again correlate to an engine speed of about 2750 RPM). In a similar manner, FIG. 6C illustrates engine speed versus time when the engine speed switch 210 is in the third position 216 and the PTO switch 218 is moved from the disengaged to the engaged position at point 503. Once again, since the engine speed is less than or equal to $S_{CE}$, the engine speed may immediately ramp from $S_{LOW,PD}$ to $S_{LOW,PE}$ (i.e., again, there is no deceleration ramp similar to that initiated at point 301 in FIG. 6A). A signal (e.g., current) may then be transmitted to the clutch by the ECU after expiration of the period of time $T_W$ as again indicated at point 505 (the period of time $T_W$ may again correspond to an engine speed of about 2750 RPM).

FIGS. 6B and 6C further illustrate exemplary engine speed versus time graphs upon subsequent movement of the switch 218 to the off or disengaged position (e.g., at points 407 and 507, respectively). As with the graph of FIG. 6A, at the expiration of the period of time $T_X$ (corresponding to the engine reaching $S_{DE}$), the clutch may disengage at $S_{DE}$ as indicated by point 409 and 509 in FIGS. 6B and 6C, respectively. Once the clutch is disengaged, the engine speed may return to its respective clutch disengaged speed (e.g., $S_{MED,PD}$ (FIG. 6B) or $S_{LOW,PD}$ (FIG. 6C)). Once again, the clutch engagement speed $S_{CE}$, the clutch disengagement speed $S_{DE}$, as well as the periods of time $T_S$, $T_X$, and $T_W$ may vary for each of the engine speed settings (e.g., MAX setting 212, EFF setting 214, and LOW setting 216) of the switch 210. Moreover, as indicated elsewhere, any of the exemplary logic described herein may be modified where the optional speed input 128 is provided (e.g., logic associated with the various time periods $T_S$, $T_X$, and $T_W$ may be replaced with detection of actual engine speed. In such a case, the ECU logic would be based upon actual (measured) engine speed as opposed to engine speed estimated from $T_S$, $T_X$, and $T_W$).

As this exemplary logic indicates, because input from the three-position engine speed switch 210 and the PTO switch 218 are connected to the ECU 220 and not directly to the engine speed regulator and the clutch, the ECU can make intelligent decisions as to where to set the engine speed and when to engage and disengage the clutch to improve performance and component life. As described herein, one embodiment may use the three-position engine speed switch 210 and the PTO engagement switch 218 to yield more than three (e.g., up to six) distinct engine speed settings: three speed settings with the PTO off and three speed settings with the PTO on. This is in contrast to the infinitely variable throttle/engine speed levers typically found on many grounds maintenance vehicles. The three speed settings with the PTO off can be programmed to provide optimum engine speeds for slow, medium, and fast transport. Moreover, the three speed settings with the PTO engaged can be used to provide desirable cutting performance under varying conditions. For example, the three speeds with the PTO engaged may provide different blade tip speeds that are determined to be efficient and suitable for performance and/or power. The ECU may also modify engine speed independently of the switch 210 position during clutch engagement/disengagement and even delay clutch engagement/disengagement until the desired engine speed is reached. Allowing the ECU to control various system parameters reduces reliance on the operator to follow recommended engine speed adjustments during engagement/disengagement of the clutch. As a result, the ECU may ensure that engine speed is accelerating (throttle is opening toward wide open throttle) when the clutch/load is engaged, placing the engine in the best situation to handle the sudden applied load while minimizing clutch/component wear/stress. Still further, as described above, control systems as shown and described herein may optimize blade stop time by determining the best engine speed at which to disengage the clutch based on a deceleration curve of the engine versus the deceleration curve of the cutting unit and drive system.

Control systems in accordance with embodiments of the present invention may offer yet additional features. For example, a supervisory control device (e.g., "master key" 221 (see, e.g., FIG. 4), may be provided. When the key is positioned to communicate with or otherwise manipulate the ECU (e.g., inserted into a receiving slot in the mower by a supervisor), the ECU may alter one or more aspects of the vehicle. For instance, the key may cause the ECU to prevent operation at the highest (e.g., maximum) engine speed when the clutch is engaged (e.g., while operators are training or to enforce operation at more efficient speed settings). In other embodiments, the key 221 could be used to prevent engine starting or operation or to actually set the engine speeds associated with one or more of the engine speed switch 210 positions 212, 214, 216. Still further, the key 221 could be used to disable or lock out one or more of the engine speed settings (e.g., disable the first discrete or maximum speed setting 212) in conjunction or independent of clutch position or, alternatively, even prevent clutch engagement.

While the master key or control device 221 may take the form of a conventional key, other types of controls (e.g., entry of a master password, code, instruction, or the like) are also contemplated. For instance, the "master key" could simply be manipulating existing switches (e.g., DIP switches (not shown)) on the ECU in a certain order that would then allow alterations to ECU parameters. Alternatively, the key 221 could be a remote device (e.g., keypad) that connects (via a wired (e.g., RS232 serial port) or wireless (e.g., radio frequency) connection) to the ECU to permit manipulation of various ECU settings or functions. In still yet other embodiments, the key 221 could be an existing device such as a smartphone or other handheld computer. Such a device could include software for interacting with the ECU (via a wired or wireless connection) to manipulate various ECU parameters. While exemplary functions of the master key may include those described above, such functions are not limiting. For example, in other embodiments, the key may prevent the vehicle from exiting a service state (described below) until specific service has been performed. In yet other embodiments, the key could be used to configure the mower to require some sort of operator validation (e.g., sequence of switch actuations) before allowing engine start and/or deck operation. In even yet other embodiments, the control system may include and/or integrate with a global positioning system (GPS). In such embodiments, the master key could program the control system to permit or deny vehicle operation at certain locations/properties. Moreover, grounds maintenance vehicles are contemplated that incorporate a wireless communication module as part of, or otherwise connected to, the control system. Such a module could allow supervisory remote control of ECU functions when desired (e.g., remotely enforcing vehicle shutdown or remotely forcing the vehicle into a service state).

In one embodiment, clutch engagement may be disabled (and, if the clutch is currently engaged, it may be automatically disengaged regardless of the setting of the PTO switch 218) when the ECU is in the service state. The ECU may, when in the service state, in addition or alternatively, reduce and/or limit engine speed to a reduced maximum speed setting (e.g., reduced to a service state speed setting limiting the engine to a service state speed) regardless of the position of the switch 210. The service state speed setting may allow mower transportation at a reduced speed while otherwise restricting engine loading. For instance, the service state may set the maximum engine speed to a service speed setting equivalent to $S_{MED,PD}$ (e.g., about 2500 RPM) regardless of the position of the switch 210 or switch 218.

While not illustrated or described herein, the ECU may monitor other system and/or operator events and take action accordingly. For example, were the operator to change the engine speed switch setting from the first "maximum" speed setting 212 in FIGS. 5A and 5B to either the second or third speed setting between, for example, steps 324 and 326, the ECU could change the engine speed command accordingly.

Still further, the system (e.g., ECU) may monitor other system parameters via one or more sensors 223 (see, e.g., FIG. 4). For example, the sensor(s) 223 may include (but are not limited to): a clutch current sensor; a voltage sensor; an engine and/or transmission temperature sensor; an engine oil pressure sensor, an operator presence sensor (e.g., seat switch); a drive lever 110 position (e.g., neutral) sensor; a ground speed sensor, etc. When the sensor(s) 223 reports an out-of-tolerance condition (e.g., a signal from one of the sensors that is outside of predetermined limits) to the ECU (e.g., voltage (or clutch current) is above or below a predetermined threshold voltage (or current), the engine or transmission temperature is above a predetermined maximum temperature, the engine oil pressure is below a recommended pressure, the operator is no longer present, the drive control levers are in the neutral position, or the ground speed is above or below a certain level), the ECU may take action. For example, the ECU could, under one or more of these circumstances, disable the clutch and/or reduce and/or otherwise limit engine speed (or otherwise place the vehicle into the service state).

While control systems in accordance with embodiments of the present invention are described herein as adapted to control both engine speed and clutch engagement/disengagement, such configurations are not limiting. For example, other embodiments of the invention may incorporate a control system that provides an engine speed switch 210 having multiple, discrete settings (e.g., a system substantially as already described and illustrated herein), but may lack any interaction with or control of the clutch mechanism. Such a system would still provide many benefits over conventional, adjustable throttles (e.g., maintaining desired engine speed during operation, providing different engine speeds for different working conditions, etc.). In this speed-only configuration, the ECU would be correspondingly simplified to eliminate the clutch communication and clutch engagement/disengagement logic already described and illustrated herein. In yet other embodiments, the ECU could monitor a seat sensor or switch 223 (see FIG. 4) and limit or slow the engine speed (e.g., to idle) and/or deny engagement of (or, if already engaged, disengage) the clutch mechanism unless operator presence is detected. In yet other embodiments, the ECU could monitor the position of the drive control levers such that, as the levers move toward a neutral position, the engine speed may slow and likewise increase as the levers are moved toward a forward position. In another embodiment, the ECU could increase (or decrease) engine speed when the drive control levers 110 (see FIG. 1) are moved from (or to) a neutral lock position to (or from) an operating position, and optionally, could engage/disengage the clutch mechanism. In still yet other embodiments, engine speed selection could be controlled by a conventional throttle lever or other similar functional control wherein the maximum engine speed associated with the throttle lever would be limited by the position of an associated switch, e.g., a two or three position speed switch like the switch 210 described herein.

Illustrative embodiments of this invention are described and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A grounds maintenance vehicle comprising:
    a chassis adapted to be supported upon a ground surface by a plurality of ground-engaging wheels;
    an engine supported by the chassis and adapted to power at least one of the plurality of ground-engaging wheels to propel the vehicle over the ground surface, the engine comprising an output shaft and an engine speed regulator;
    an implement drive system adapted to transmit power to an implement attached to the chassis;
    an electronically controlled clutch mechanism disposed between the implement drive system and the output shaft of the engine, the clutch mechanism being configurable in both a disengaged state, wherein the engine is decoupled from the implement drive system, and an engaged state, wherein the engine is coupled to the implement drive system;
    a user-selectable power take-off (PTO) switch having an off setting corresponding to the disengaged state of the clutch mechanism, and an on setting corresponding to the engaged state of the clutch mechanism;
    a user-selectable engine speed switch adapted to set a speed of the engine at one of at least a discrete first speed setting and a discrete second speed setting; and
    an electronic control unit (ECU) adapted to receive instructions from both the PTO switch and the engine speed switch and output both a speed command to the engine speed regulator and a clutch command to the clutch mechanism, wherein, for at least one of the first and second speed settings, the ECU is adapted to ultimately deliver to the engine speed regulator: a constant first engine speed command when the PTO switch is in the off setting; and a constant second engine speed command, different than the first engine speed command, when the PTO switch is in the on setting.

2. The vehicle of claim 1, wherein the second engine speed command is delivered to the engine speed regulator after a clutch engage engine speed command is delivered that is lower than both of the first and second engine speed commands.

3. The vehicle of claim 2, wherein the ECU is adapted to issue a clutch engage command at a predetermined time period after delivering the second engine speed command.

4. The vehicle of claim 1, wherein the implement comprises a mower cutting deck.

5. The vehicle of claim 1, wherein the engine comprises an electronic fuel injection system.

6. The vehicle of claim 1, wherein the engine speed regulator comprises an electronic governor.

7. The vehicle of claim 1, wherein the PTO switch comprises a two-position, push-pull switch.

8. The vehicle of claim 1, wherein the engine speed switch comprises a three-position rocker-type switch.

9. The vehicle of claim 1, wherein the engine speed switch comprises:
    a first position corresponding to a maximum speed setting of the engine;
    a second position corresponding to an intermediate speed setting of the engine that is less than the maximum speed setting; and
    a third position corresponding to a low speed setting of the engine that is less than the intermediate speed setting.

10. A grounds maintenance vehicle comprising:
a chassis adapted to be supported upon a ground surface by a plurality of ground-engaging wheels;
an engine supported by the chassis and adapted to power at least one of the plurality of ground-engaging wheels to propel the vehicle over the ground surface, the engine comprising an electronic governor adapted to control engine speed;
an implement drive system adapted to selectively couple to the engine, the implement drive system adapted to deliver power to an implement attached to the chassis;
an electronically controlled clutch mechanism disposed between the implement drive system and the engine, the clutch mechanism being configurable in both a disengaged state, wherein the engine is decoupled from the implement drive system, and an engaged state, wherein the engine is coupled to the implement drive system;
a user-selectable power take-off (PTO) switch movable between an off position corresponding to the disengaged state of the clutch mechanism, and an on position corresponding to the engaged state of the clutch mechanism;
an engine speed switch movable between any one of three discrete positions comprising: a first switch position corresponding to a maximum speed setting of the engine; a second switch position corresponding to a medium speed setting of the engine; and a third switch position corresponding to a low speed setting of the engine; and
an electronic control unit (ECU) adapted to receive inputs from both the PTO switch and the engine speed switch, wherein the ECU is adapted to output engine speed commands to the electronic governor corresponding to each respective position of the engine speed switch, wherein for at least one of the first, second, and third switch positions, the engine speed is commanded to: a first engine speed when the PTO switch is in the off position; and a second engine speed, greater than the first engine speed, when the PTO switch is in the on position.

11. The vehicle of claim 10, wherein the ECU is, upon receiving an input indicative that the PTO switch has moved to the on position, adapted to send a clutch engage command only while engine speed is accelerating toward the second engine speed.

12. The vehicle of claim 10, further comprising one or more sensors, wherein the ECU is adapted to disengage the clutch mechanism and/or reduce engine speed based upon inputs received from the one or more sensors.

13. The vehicle of claim 12, wherein the one or more sensors comprises a sensor selected from the group consisting of an engine temperature sensor, a transmission temperature sensor, an engine oil pressure sensor, a voltage sensor, a clutch current sensor, an operator presence sensor, a drive lever position sensor, and a ground speed sensor.

14. The vehicle of claim 10, further comprising a master key adapted to alter a function of the ECU by modifying the speed setting of the engine, preventing engine starting or operation, and/or preventing engagement of the clutch mechanism.

15. A method of controlling a grounds maintenance vehicle, comprising:
providing an engine speed switch positionable in at least a discrete first and second position corresponding, respectively, to first and second speed settings of an engine of the vehicle;
selecting the first position with the engine speed switch;
transmitting an input signal, corresponding to the first position of the engine speed switch, to an electronic control unit (ECU);
transmitting, from the ECU to an engine speed regulator of the engine, a first engine speed command corresponding to the first speed setting, ultimately resulting in the engine attaining a first engine speed;
receiving, with the ECU, a signal indicative of movement of a PTO switch from an off position to an on position;
transmitting, from the ECU to the engine speed regulator, a clutch engage engine speed command corresponding to a predetermined clutch engage engine speed;
transmitting from the ECU to the engine speed regulator, a second engine speed command corresponding to a second engine speed that is higher than the clutch engage engine speed; and
transmitting a clutch engage command from the ECU to a clutch mechanism while the engine speed is increasing from the clutch engage engine speed to the second engine speed.

16. The method of claim 15, wherein the second engine speed command is higher than the first engine speed command for the same position of the power switch.

17. The method of claim 15, wherein the clutch engage command is transmitted at a predetermined time period after the ECU transmits the second engine speed command.

18. The method of claim 15, wherein the first engine speed is greater than the clutch engage engine speed.

19. The method of claim 15, wherein the first engine speed is less than the clutch engage engine speed.

20. The method of claim 15, further comprising engaging the clutch mechanism completely prior to the engine reaching the second engine speed.

21. The method of claim 15, further comprising:
receiving, with the ECU, a signal indicative of movement of the PTO switch to the off position;
initiating, with the ECU, a reduction in engine speed from the second engine speed; and
transmitting a clutch disengage command from the ECU to the clutch mechanism when the engine reaches a clutch disengage engine speed, whereby the clutch mechanism moves from an energized state to a de-energized state.

22. The method of claim 21, wherein the clutch disengage engine speed is selected to reduce a stop time of an implement driven by the clutch mechanism by relying, at least in part, on deceleration of the engine.

23. The method of claim 21, further comprising increasing the speed, with the ECU, from the clutch disengage engine speed to the first engine speed after the clutch mechanism has moved to the de-energized state.

24. The method of claim 15, further manipulating the ECU with a master key to alter one or more of the speed settings of the engine and/or to prevent engagement of the clutch mechanism.

25. The method of claim 15, further comprising:
detecting a signal indicative of at least one of engine temperature, oil pressure, transmission temperature, voltage, and clutch current;
determining, with the ECU, whether the signal is outside of predetermined limits; and
reducing and/or limiting a speed of the engine, regardless of a position of the engine speed switch, to a service state speed.

26. The method of claim 25, further comprising disengaging the clutch mechanism regardless of the position of the PTO switch.

* * * * *